United States Patent
Van Der Ploeg

(10) Patent No.: US 12,544,728 B2
(45) Date of Patent: *Feb. 10, 2026

(54) ELECTRICALLY HEATED REACTOR, A FURNACE COMPRISING SAID REACTOR AND A METHOD FOR GAS CONVERSIONS USING SAID REACTOR

(71) Applicant: SHELL USA, INC., Houston, TX (US)

(72) Inventor: Govert Gerardus Pieter Van Der Ploeg, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 758 days.

This patent is subject to a terminal disclaimer.

(21) Appl. No.: 17/779,358

(22) PCT Filed: Dec. 18, 2020

(86) PCT No.: PCT/EP2020/086923
§ 371 (c)(1),
(2) Date: May 24, 2022

(87) PCT Pub. No.: WO2021/130107
PCT Pub. Date: Jul. 1, 2021

(65) Prior Publication Data
US 2022/0410103 A1    Dec. 29, 2022

(30) Foreign Application Priority Data
Dec. 23, 2019 (EP) .................................. 19219215

(51) Int. Cl.
*B01J 8/06* (2006.01)
*B01J 8/02* (2006.01)
(Continued)

(52) U.S. Cl.
CPC .............. *B01J 8/062* (2013.01); *B01J 8/0242* (2013.01); *B01J 8/067* (2013.01); *C01B 3/382* (2013.01);
(Continued)

(58) Field of Classification Search
CPC . B01J 8/062; B01J 8/0242; B01J 8/067; B01J 2208/0053; B01J 8/0285
See application file for complete search history.

(56) References Cited

U.S. PATENT DOCUMENTS

| 6,315,972 B1 | 11/2001 | Mehdizadeh et al. |
| 6,380,525 B2 | 4/2002 | Dalton et al. |

(Continued)

FOREIGN PATENT DOCUMENTS

| CA | 2469859 A1 | 11/2005 |
| CN | 202107542 U | 1/2012 |

(Continued)

OTHER PUBLICATIONS

Rieks et al., experimental study of methane dry reforming in an electrically heated reactor, (international journal of hydrogen energy 40 (2015) 15940-15951).*

(Continued)

*Primary Examiner* — Jafar F Parsa
(74) *Attorney, Agent, or Firm* — SHELL USA, INC.

(57) ABSTRACT

An electrically heated reactor is a tube surrounded by electrical heating means having radiative sheeting placed coaxially with regard to the reactor tube. The surface area of the sheeting facing the outer surface area of the reactor tube defines an inner surface area covering at least 60% of the reactor tube outer surface area. The distance between the reactor tube and the heating means is selected such that the ratio between the inner surface area of the electrical heating means to the reactor tube outer surface area is in the range (Continued)

of 0.7 to 3.0. The reactor is useful in many industrial scale high temperature gas conversion and heating technologies.

6 Claims, 3 Drawing Sheets

(51) Int. Cl.
  *C01B 3/38* (2006.01)
  *C01B 3/382* (2026.01)
(52) U.S. Cl.
  CPC ............ *B01J 2208/00389* (2013.01); *B01J 2208/0053* (2013.01); *C01B 2203/0233* (2013.01); *C01B 2203/0238* (2013.01)

(56) References Cited

U.S. PATENT DOCUMENTS

| | | |
|---|---|---|
| 6,740,303 B2 | 5/2004 | Boneberg et al. |
| 6,878,471 B1 | 4/2005 | Burch et al. |
| 7,025,875 B2 | 4/2006 | Grieve et al. |
| 7,074,373 B1 | 7/2006 | Warren et al. |
| 7,150,866 B2 | 12/2006 | Wieland et al. |
| 7,160,342 B2 | 1/2007 | Grieve et al. |
| 7,179,325 B2 | 2/2007 | Oyama et al. |
| 7,867,301 B2 | 1/2011 | Agnew et al. |
| 8,303,929 B2 | 11/2012 | Peng et al. |
| 8,614,158 B2 | 12/2013 | Leviness |
| 9,011,560 B2 | 4/2015 | Simmons et al. |
| 9,126,831 B2 | 9/2015 | Kale |
| 9,227,185 B2 | 1/2016 | Mamedov |
| 9,266,731 B2 | 2/2016 | Mass et al. |
| 9,295,961 B2 | 3/2016 | Laska et al. |
| 9,440,851 B2 | 9/2016 | Hwang |
| 9,725,385 B2 | 8/2017 | Steynberg et al. |
| 10,351,422 B2 | 7/2019 | Machhammer et al. |
| 10,589,257 B2 | 3/2020 | Herskowitz et al. |
| 10,676,354 B2 | 6/2020 | Finnerty et al. |
| 2002/0081253 A1 | 6/2002 | Abe |
| 2002/0108306 A1 | 8/2002 | Grieve et al. |
| 2003/0153632 A1 | 8/2003 | Wang et al. |
| 2004/0083651 A1 | 5/2004 | Kaufman et al. |
| 2005/0223644 A1 | 10/2005 | Kim |
| 2006/0124445 A1 | 6/2006 | Labrecque et al. |
| 2006/0135631 A1 | 6/2006 | Kopponen et al. |
| 2007/0049648 A1 | 3/2007 | Shessel |
| 2007/0084116 A1 | 4/2007 | Ringler et al. |
| 2007/0107308 A1 | 5/2007 | Bonadies et al. |
| 2007/0131909 A1 | 6/2007 | Rojey et al. |
| 2008/0044347 A1 | 2/2008 | Roychoudhury et al. |
| 2008/0260628 A1 | 10/2008 | Moon et al. |
| 2009/0199475 A1 | 8/2009 | Devries et al. |
| 2010/0140552 A1 | 6/2010 | Ammouri et al. |
| 2010/0186824 A1 | 7/2010 | Bowe et al. |
| 2010/0242814 A1 | 9/2010 | Jeney |
| 2010/0327231 A1 | 12/2010 | Whitmore |
| 2011/0079016 A1 | 4/2011 | Etemad et al. |
| 2012/0024843 A1 | 2/2012 | Lissianski et al. |
| 2013/0058861 A1 | 3/2013 | Idem et al. |
| 2013/0197288 A1 | 8/2013 | Schafer et al. |
| 2013/0248768 A1 | 9/2013 | Zachar |
| 2014/0079626 A1 | 3/2014 | Ji et al. |
| 2014/0134101 A1 | 5/2014 | Idem et al. |
| 2014/0369897 A1 | 12/2014 | Verykios et al. |
| 2015/0047252 A1 | 2/2015 | Goerz |
| 2015/0064096 A1 | 3/2015 | Noyes et al. |
| 2015/0125771 A1 | 5/2015 | Finnerty et al. |
| 2015/0308676 A1 | 10/2015 | Lee et al. |
| 2015/0337224 A1 | 11/2015 | Stiegman |
| 2016/0102259 A1 | 4/2016 | Bool et al. |
| 2016/0115036 A1 | 4/2016 | Yoo et al. |
| 2016/0177199 A1 | 6/2016 | Amin et al. |
| 2016/0288074 A1 | 10/2016 | Vogel et al. |
| 2016/0325990 A1 | 11/2016 | Galloway |
| 2017/0106360 A1 | 4/2017 | Meriam |
| 2017/0137284 A1 | 5/2017 | Simmons et al. |
| 2018/0208466 A1 | 7/2018 | Noyes et al. |
| 2021/0113980 A1 | 4/2021 | Van Der Ploeg |

FOREIGN PATENT DOCUMENTS

| | | |
|---|---|---|
| CN | 204816461 U | 12/2015 |
| CN | 105754636 A | 7/2016 |
| CN | 205474153 U | 8/2016 |
| CN | 205635499 U | 10/2016 |
| CN | 108841424 A | 11/2018 |
| DE | 102014112436 A1 | 3/2016 |
| EP | 0178795 A2 | 4/1986 |
| EP | 2520542 A1 | 11/2012 |
| FR | 2525122 A1 | 10/1983 |
| GB | 124760 A | 6/1920 |
| JP | 2001198904 A | 7/2001 |
| JP | 2007000774 A | 1/2007 |
| JP | 2016153368 A | 8/2016 |
| KR | 20060104718 A | 10/2006 |
| KR | 20110094800 A | 8/2011 |
| WO | 8911448 A1 | 11/1989 |
| WO | 2009011984 A1 | 1/2009 |
| WO | 2013135660 A1 | 9/2013 |
| WO | 2013135666 A1 | 9/2013 |
| WO | 2013135668 A1 | 9/2013 |
| WO | 2013135673 A1 | 9/2013 |
| WO | 2014064648 A2 | 5/2014 |
| WO | 2015189270 A1 | 12/2015 |
| WO | 2015195091 A2 | 12/2015 |
| WO | 2016022090 A1 | 2/2016 |
| WO | 2021063792 A1 | 4/2021 |

OTHER PUBLICATIONS

Office Action Received for Chinese Application No. 202080089324.0, Mailed on Jun. 18, 2023, 23 Pages (11 Pages of English Translation and 12 Pages of Official Copy).
International Search Report and Written Opinion received for PCT Patent Application No. PCT/EP2020/086923, mailed on Mar. 18, 2021, 9 pages.
International Search Report and Written Opinion received for PCT Patent Application No. PCT/EP2019/066823, mailed on Sep. 20, 2019, 9 pages.
Database WPI Week 201619, 1 page, XP002784612.
Office Action Received for Chinese Application No. 201980040180.7, Mailed on Jan. 5, 2023, 15 Pages (8 Pages of English Translation and 7 Pages of Official Copy).

* cited by examiner

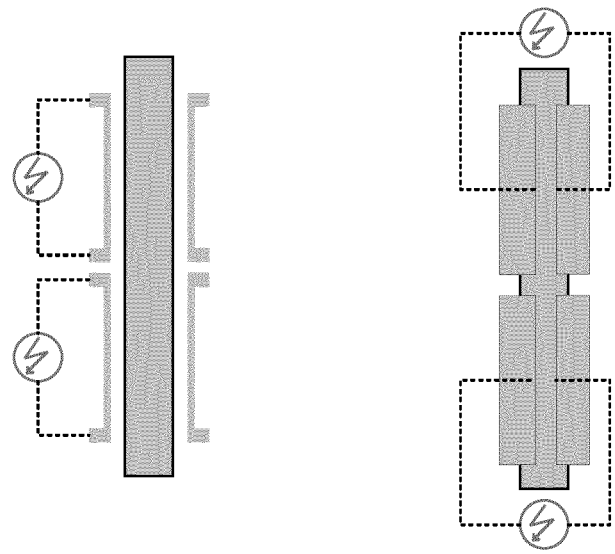
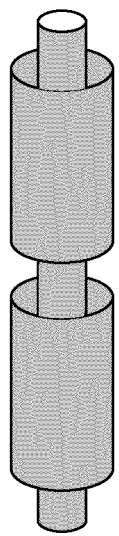 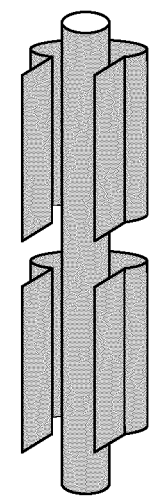
Figure 1A      Figure 1B

ELECTRICALLY HEATED REACTOR, A FURNACE COMPRISING SAID REACTOR AND A METHOD FOR GAS CONVERSIONS USING SAID REACTOR

CROSS REFERENCE TO RELATED APPLICATIONS

This is a National stage application of International application No PCT/EP2020/086923, filed 18 Dec. 2020, which claims priority of EP Application Serial No. 19219215.1, filed 23 Dec. 2019 which is incorporated herein by reference in its entirety.

FIELD OF THE INVENTION

The present invention relates to an electrically heated reactor comprising radiative sheeting placed coaxially around the reactor, to a furnace comprising one or more reactor tubes and to a method of performing a gas conversion process at high temperatures, comprising introducing at least one gaseous reactant into said reactor. The reactor, furnace and method are useful in many industrial scale high temperature chemical conversions and heating technologies.

BACKGROUND OF THE INVENTION

Problems with global warming and the need to reduce the world's carbon footprint are currently high on the political agenda. In fact, solving the global warming problem is regarded as the most important challenge facing mankind in the 21st century. The capacity of the earth system to absorb greenhouse gas emissions is already exhausted, and under the Paris climate agreement, current emissions must be fully stopped until around 2070. To realize these reductions, at least a serious restructuring of industry is needed, away from conventional energy carriers producing $CO_2$. This decarbonization of the energy system requires an energy transition away from conventional fossil fuels such as oil, natural gas, and coal. A timely implementation for the energy transition requires multiple approaches in parallel. For example, energy conservation and improvements in energy efficiency play a role, but also efforts to electrify transportation and industrial processes. After a transitional period, renewable energy production is expected to make up most of the world's energy production, which will for a significant part consist of electricity.

As renewable power costs are already low in certain regions of the world, technologies using electrically heated reactors and installations can be attractive to replace conventional hydrocarbon-fired heated reactors and high duty heating operations. Forecasted power prices and costs of $CO_2$ will increase the economic attractiveness of these reactors even more.

Electricity is the highest grade of energy available. When designing an efficient industrial process, which converts electrical energy into chemical energy, several options can be considered. These options are electrochemistry, cold plasmas, hot plasmas or thermally. In small scale laboratory settings, electrical heating is already being applied for many types of processes. However, when the options are considered for designing chemical (conversion) technologies at an industrial scale, such as gas conversion, each of those options comes with certain complexities and material requirements. This is especially the case when chemical conversion processes are highly endothermic, as the required heat flux and temperature levels are high. In the industry there is a need for electrification technologies that are suitable for endothermic chemical reactions and heating technologies at industrial scale.

US2016288074 describes a furnace for steam reforming a feed stream containing hydrocarbon, preferably methane, having: a combustion chamber, a plurality of reactor tubes arranged in the combustion chamber for accommodating a catalyst and for passing the feed stream through the reactor tubes, and at least one burner which is configured to burn a combustion fuel in the combustion chamber to heat the reactor tubes. In addition, at least one voltage source is provided which is connected to the plurality of reactor tubes in such a manner that in each case an electric current which heats the reactor tubes to heat the feedstock is generable in the reactor tubes.

US2017106360 describes how endothermic reactions may be controlled in a truly isothermal fashion with external heat input applied directly to the solid catalyst surface itself and not by an indirect means external to the actual catalytic material. This heat source can be supplied uniformly and isothermally to the catalyst active sites solely by conduction using electrical resistance heating of the catalytic material itself or by an electrical resistance heating element with the active catalytic material coating directly on the surface. By employing only conduction as the mode of heat transfer to the catalytic sites, the non-uniform modes of radiation and convection are avoided permitting a uniform isothermal chemical reaction to take place.

EP18180849.4 describes a reactor configuration comprising at least one electrically heated furnace which defines a space, with at least one reactor tube placed within the furnace space and said reactor tube having an exit and entrance outside of the reactor furnace, and wherein said furnace is further provided with at least one electrical radiative heating element suitable for heating (the heating element) to high temperatures in the range of 400 to 1400° C., said heating element being located inside said furnace in such a way that the heating element is in no direct contact with the at least one reactor tube; and a number of inspection ports in the furnace wall such to be able to visually inspect the condition of the at least one reactor tube on all sides of said reactor tube during operation, the total number of inspection ports being sufficient to inspect all reactor tubes present in the furnace at their full length and circumference; and wherein the heating duty of the furnace is at least 3 MW.

The prior art approaches have their unique challenges, capabilities and/or are based on combining combustion heating with linear electrical heating. In particular, there are challenges related to the potentially very high temperature of heating elements. Therefore, there is still a need for more and other options for electrical heating technology that can sustainably be applied for large scale chemical reactions at high temperatures.

The present disclosure provides a solution to said need. This invention optimizes high temperature heating through increasing/maximizing the area ratio between the heater and reactor tube, thereby allowing lowering the temperature of heating elements.

SUMMARY OF THE INVENTION

Accordingly, the present disclosure relates to an electrically heated reactor—in particular for continuous flow reactions or process heating—having an outer surface area, an inlet at one end of the reactor and an outlet at the other end of the reactor, wherein (a) the reactor is a tube surrounded by electrical heating means at a certain distance; (b) the electrical heating means comprises radiative sheeting, generally consisting of resistance based heating material, placed coaxially around the reactor tube, the surface area of the sheeting facing the outer surface area of the reactor tube defining an inner surface area of the electrical heating means; (c) the inner surface area of the heating means covers at least 60%, preferably at least 70%, more preferably at least 80%, and particularly at least 95%, of the reactor tube outer surface area; and (d) the distance between the reactor tube and the heating means is selected such that the ratio between the inner surface area of the electrical heating means to the reactor tube outer surface area is in the range of 0.7 to 3.0.

Electrically heating a process in a reactor demands a heat-flux and temperature profile. In many applications the heat-flux is larger—and the temperature in the reactor is lower—at the inlet of the reactor, where the process flow enters, whereas towards the outlet the heat-flux is lower—whilst having higher temperature in the reactor. The present invention can accommodate this requirement to optimize the conversion of the desired reactions.

The present disclosure also relates to a furnace, comprising within the furnace one or more reactor tubes according to the present disclosure, said one or more reactor tubes having an entrance and exit outside of the furnace; and one or more inspection ports in the furnace wall, each of which inspection ports being placed opposite to a reactor tube.

Further, the present disclosure relates to a method of performing a gas conversion process at high temperatures, comprising introducing at least one gaseous reactant into a reactor according to the present disclosure, electrically heating the reactor to a temperature in the range of 400-1400° C., preferably from 500 to 1200° C., even more preferred from 600 to 1100° C., through radiative heating of the heating means, and performing the high temperature gas conversion.

DETAILED DESCRIPTION OF THE DISCLOSURE

Several heating options may be considered for replacing industrial scale gas-fired heating by electrical heating. In selecting suitable heating options, lifetime of the heating means plays an important role. The present invention allows to lower the heating means temperature as the invention focuses on most efficient heat transfer between the heating means and the reactor wall. As its temperature is of importance to the lifetime, and thus to the related maintenance of the equipment, the present disclosure assures that such high temperatures for example needed for naphtha creaking, can be accomplished using metallic heater solutions.

According to the present disclosure, the electrical heating means comprises radiative sheeting, of a suitable thickness, suitably ranging from 3 mm to 25 mm. This means that the electrically generated heat is transferred by means of radiation. Radiative heating is described by Stefan-Boltzmann's law for radiation. First principle calculations based on Stefan-Boltzmann's law suggest that a heating tube temperature of 1231° C. is required to transfer 80 kW·m$^2$ of heat energy to a reactor tube at 1100° C.

According to the invention, it has now been found that a particularly suitable way of electrical radiative heating can be provided when the heating means is made of resistance-based heating material. Electric resistance heating is a well-known method of converting electrical power into heat. This technology is used in many other industrial applications. High temperature (>1000° C.) resistance heating is, for example, used in the glass industry, metal industry and many laboratory installations. When considering an isolated system, converting power to heat by means of resistance heating, is near 100% efficient. Resistance heating takes place by means of the "Joule effect". Joule's first law states that the power of heating generated by an electrical conductor is proportional to the product of its resistance and the square of the current ($I^2 \cdot R$, wherein I is the current and R is the resistance).

Many different types of electrical resistance heating materials exist, each having their specific application purpose. For the present application, high temperatures must be achieved for which several technologies are available. As an example, mineral insulated wire technology may be used for certain applications, however use thereof is limited. In the present reactor advantageously the radiative sheeting comprises NiCr or FeCrAl (Fecralloy) based resistance heating materials. Preferably, the radiative sheeting is made of FeCrAl based resistance heating materials. Most preferably, the radiative sheeting is made of FeCrAl. FeCrAl resistance materials are used in robust heating technologies. The duty can be controlled by means of relatively 'simple' on/off control. Theoretically, high voltages can be applied to deliver the heating duty. However, this is not commonly applied as it puts extra load on the electrical switches and requires suitable electrical insulation material. Fecralloy heating materials have favorable lifetime and performance properties. The material is capable of operating at relatively high temperature (up to ~1300° C.). Preferably, Fecralloy heating materials are used in an oxidizing atmosphere (>200 ppm $O_2$) to maintain an $Al_2O_3$ protective layer on the elements. The highest temperature that can be achieved in the reactor configuration of the present disclosure is mainly limited by the type of heating materials that is used. The present reactor is suitable for reactions at temperatures ranging from 400 to 1400° C., preferably from 500 to 1200° C., even more preferred from 600 to 1100° C.

According to the invention, preferably, the reactor is surrounded by electrical heating means in the form of radiative sheeting that is divided into at least two, more preferred at least three, segments which are placed lengthwise along the reactor tube, each of which segments being connected to a separate power control. This allows temperature control along the length of the reactor. The number of segments is dependent on the desired level of temperature control. The distance between the segments is selected to be as short as possible, but allowing for expansion, which is different for each segment.

In another preferred embodiment according to the invention, the heating means surrounding the reactor tube comprises, and preferably is, a radiative sheeting placed coaxially around/in parallel with the reactor tube, while leaving an opening along the length of the reactor tube with a size that at least matches the diameter of the reactor tube. This allows easy maintenance and handling of the heater sheets. Sheets can easily be inserted and removed when open on one side.

Further, in another preferred embodiment according to the invention, the heating means is a radiative sheeting consisting of panels of the radiative heating material, optionally provided with openings between the panels. Using panels allows easy maintenance and can reduce costs. Further, openings can be created between the panels to allow inspection of the reactor tube.

According to the invention, the ratio between the inner surface area of the electrical heating means to the reactor tube outer surface area is in the range of 0.7 to 3.0. Preferably said ratio is between 1.1 and 2.5, even more preferred between 1.5 and 2.3, and particularly between 1.9 and 2.1.

Where applicable, attachment materials, such as clamps and supports, for the radiative sheeting, panels and/or segments thereof are used to properly position and connect them inside for example a furnace. Insulation materials, such as ceramic materials, are used where needed to protect any materials from the high temperatures that are created inside the reactor and/or provide electrical isolation.

The term "reactor" as used herein should be understood to comprise any industrial reactor suitable for industrial scale reactions and process heating, and, accordingly, the term reactor tube should be understood to comprise any vessel in the form a tube in which (a) substance(s) is (are) heated to high temperature.

A conventional gas conversion reactor, like for example, but not limited to, a steam methane reformer (SMR), uses gas fired burners to supply the endothermic heat energy required to perform the endothermic gas conversion reaction. Multiple burner reactor configurations exist such as top, bottom and side fired. Supplying heat by means of electrical heating comes closest to a side fired burner configuration. The side fired configuration is in general the most desirable configuration as the heat-flux to the reactor tubes can be controlled over the reactor tube length. However, this side fired burner configuration is not widely applied in practice as it has several disadvantages. In case of gas-fired heating, the side fired configuration requires many burners and the heat flux control results in an increased complexity of the combustion control. The heat flux herein is defined as the flow of per unit of area per unit of time (in SI its units are watts per square meter ($W/m^2$). energy per unit of area per unit of time (in SI its units are watts per square meter ($W/m^2$).

When using electrical heating, the above-mentioned disadvantages of side gas-fired heating are no longer present and the process advantages of having a more accurate duty control over the length of the reactor tube can be accomplished. For example, higher outlet temperatures can be achieved, thereby improving conversion.

The use of reactors according to the present disclosure can be scaled up to industrial scale. The sizes of conventional reactor tubes used in industrial scale gas-conversion reactors are in the order of 120-140 mm outside diameter and 12 meter length. Notwithstanding that, many different process tube configurations may be applied to suit the need of the process. For electrical heating, given the increased controllability of heat fluxes and temperature optimization of the reactor tube configuration may be needed, for example resulting in a more compact design. Suitably, in the present reactor the size of a reactor tube is at least similar to the conventional reactor tube size.

For many industrial gas conversion reactions, preferably, the furnace comprises at least ten or more reactor tubes, suitably of the conventional size. It is desirable to have as many reactor tubes enclosed in one furnace as practically possible. The number of heating means and the positioning thereof depends on the required heat flux, the required temperatures, the material properties of the reactor tubes and the material properties of the heating elements, and the size thereof. The heating means are placed along the reactor tubes in such a way that the reactor tubes are heated essentially over the full length, only excluding the inlet and outlet as required.

When in operation, a differentiated heat flux and temperature profile develops over the height/length of the reactor. To control the temperatures in different sections of the reactor and to achieve a heat flux profile over the surface of the reactor tube(s), the heating means preferably comprises of at least two segments, i.e. heating zones, along the height/length of the reactor, wherein each heating zone has its own power control unit. As described above, this allows to modify the heat fluxes in the different segments, wherein each of the segments can have a different heat flux. Especially, the reactor in the present reactor configuration comprises at least four segments/heating zones (see e.g. FIG. 3). In particular, the reactor preferably comprises as many segments as practically possible to allow a fully controlled heat flux and temperature profile. In a preferred embodiment, the present reactor comprises at least twelve segments.

In a further embodiment, the present disclosure relates to a furnace, comprising within the furnace one or more reactor tubes according to the present invention, said one or more reactor tubes having an entrance and exit outside of the furnace; and one or more inspection ports in the furnace wall, each of which inspection ports being placed opposite to a reactor tube. When the furnace comprises a series of reactor tubes according to the invention, placed in parallel, the heating means of each of the reactor tubes are connected in series to achieve a desired voltage level across the tubes. Especially when the heating means is segmented, the segments at the same level of the reactor tubes ca then achieve the same temperature profile.

In order to operate at industrial scale, and to obtain sufficient reactor capacity, a multitude of furnaces according to the invention may be applied. The number depends on factors like the required reactor volume, the size of the furnace, the number of reactor tubes, etcetera. The type of furnace may be selected as appropriate, and heating arrangements therein may be selected as appropriate, such as using dividing walls and heating columns. A preferred furnace design for use according to the present disclosure is a chamber furnace, which allows most efficient use of space on industrial scale.

When referring to heating duty in this disclosure, this is defined as: the product of the heat flux ($\Phi_q$) on the surface and the (relevant) receiving surface area (A). For example, the heating duty of a furnace with a heat flux of $\Phi_q=120$ $kW/m^2$ and a receiving area of $A=30\ m^2$ is 3.6 MW. The heating duty of a furnace according to the present disclosure is preferably at least 3 megawatts (MW). The further preferred heating duty is at least 10 MW, and more preferably at least 30 MW. At industrial scale the heating duty can be as high as multiple gigawatts (GW), e.g. 5 or 10 GW, in total, requiring multiple furnace units each having a heating duty of for example 500 MW.

The furnace according to the present disclosure is provided with inspection ports in the furnace wall such to be able to visually inspect the condition of the reactor tube(s) on all sides during operation, wherein the total number of inspection ports is sufficient to inspect all reactor tubes present in the furnace at their full length and circumference. This is preferably achieved by using infrared radiant measurement techniques (e.g. pyrometer) from which hot spots can be made more accurately visible. Such ports are configured as a small open path through the wall of the furnace. Each such opening is provided with a hatch which closes the port in case it is not used.

In a preferred embodiment of the present disclosure the reactor comprises a combination of some or all different preferred features. Accordingly, the reactor preferably is a reactor tube surrounded by Fecralloy radiative sheeting placed coaxially around the reactor tube at a distance between the reactor tube and sheeting being selected such that the ratio between the inner surface area of the radiative sheeting to the reactor tube outer surface area is in the range of 1.9 and 2.1; the inner surface area of the heating means covers at least 95% of the reactor tube outer surface area; and wherein the radiative sheeting is divided into at least four segments which are placed lengthwise along the reactor tube, each of which segments being connected to a separate power control.

A reactor tube according to the invention may be loaded with solid catalyst components as known in the art for the desired conversions.

The reactor according to the present disclosure enables cost effective large-scale integration of renewable power into industrial scale chemical conversion reactions and other industrial heating technologies, for example into gas conversion technologies and crude distillation, and may result in a significant reduction of $CO_2$ production, and even $CO_2$ consumption. In a preferred embodiment, the reactor according to this disclosure is provided with a power supply connection to a renewable source for supplying at least part of the required power for the electrical heating.

For example, the reactor may be applied as an electrically heated steam methane reforming process unit for the production of hydrogen, as is used in Gas-To-Liquid (GTL) technologies. The Steam Methane Reforming (SMR) process requires a heat flux of ~120 kW/m2 (range 70-140 kW/m2) to provide the heat energy for the endothermic reaction taking place at a temperature level of about 600 to about 1100° C., the upper limit being governed by the maximum temperature which the metal of the reactor tubes can withstand. For reference, in FIG. 2 a scheme for conventional gas-fired SMR/HMU (Steam Methane Reformer/Hydrogen Manufacturing Unit) is shown.

The present disclosure also relates to a method of performing a gas conversion process at high temperatures, comprising introducing at least one gaseous reactant into a reactor according to this invention, electrically heating the reactor to a temperature in the range of 400-400° C. through radiative heating of the heating means, and performing the high temperature gas conversion. The actual temperature depends on the required temperature for the chemical conversion reaction and the type of heating elements used.

Preferably, the method comprises controlling the temperatures/heat fluxes in different segments of the heating means, wherein the heating means comprises at least two segments, wherein each segment has its own power control unit that is regulated to achieve a desired heat flux profile over the surface of the at least one reactor tube.

In a preferred embodiment, the reactor and/or furnace and method of the present disclosure are used for producing a synthesis gas by means of steam methane reforming, dry $CO_2$ reforming, reverse water-gas shift or a combination thereof. Accordingly, a preferred method comprises producing a synthesis gas by means of steam methane reforming, dry CO2 reforming, reverse water-gas shift or a combination thereof, comprising the steps of:
  i. Providing hydrocarbons and steam and/or $CO_2$ to the reactor according to any one of claims 1-5, such that the reaction mixture enters the at least one reactor tube;
  ii. Maintaining the reactor at a temperature of at least 400° C. by providing electrical energy to the heating means;
  iii. Allowing the hydrocarbons and steam to be converted into hydrogen and carbon monoxide; and
  iv. Obtaining from the reactor a synthesis gas stream.

The conversion in step iii. is for example followed by sample analysis by gas chromatography and/or by monitoring the temperature changes at the exit of the reactor tube.

The term hydrocarbons herein above encompasses for example treated methane, being treated fossil natural gas (preferred), or bio-methane purified from non-hydrocarbon impurities. Methane from fossil natural gas is a hydrocarbon gas mixture consisting primarily of methane (i.e. at least 80%), but commonly including varying amounts of other higher alkanes and sometimes a small percentage of nitrogen, hydrogen sulfide, carbon dioxide, Argon or helium. Treated methane is the preferred hydrocarbon, however, also other hydrocarbons, preferably treated hydrocarbons, and preferably being C2-C6 hydrocarbons, such as ethane and propane, and mixtures of hydrocarbons can be used as reactants for the process.

The methane reforming process can be done with either steam, $CO_2$ or any combination thereof. The syngas produced by methane reforming using steam has a $H_2$:CO ratio which is too high for Fischer Tropsch conversions. In a preferred embodiment, this $H_2$:CO ratio can be lowered by co-introducing $CO_2$, resulting in a semi-dry methane reforming process. The produced syngas H2:CO ratio matches the required ratio to perform Fischer Tropsch conversion. While using the reactor configuration of the present disclosure, also only $CO_2$ and methane can be fed in a dry-reforming process to produce a $H_2$:CO ratio of 1.

When using electrical power to heat this endothermic process relates to the so-called Power-To-Liquid (PTL) process instead of Gas-To-Liquid (GTL).

Reverse Water Gas Shift (RWGS) is a high temperature moderately endothermic process. RWGS becomes valuable when $CO_2$ is used as carbon source instead of methane or a combination of methane and $CO_2$. Also, this gas conversion reaction is an example of a reaction that can suitably be performed in the reactor configuration of the present disclosure.

The reactor, furnace and method according to the present disclosure have broad application possibilities. As high temperature gas conversions and process heating are widely applied in chemical industry, the present disclosure provides numerous opportunities for use in petrochemical or chemical application. As the heat flux and temperature levels that can be achieved are amongst the most severe, any kind of (gas-)fired equipment can be replaced with electrical radiative heat generation, such as crude furnaces, distillation preheat furnaces, hot-oil furnaces, many chemical gas conversion reactors, for example, but not limited to, steam cracking with several feeds, several (steam) reforming reactions, hydroprocessing reactions, etcetera. Steam cracking herein is defined as the thermal cracking of hydrocarbons in the presence of steam to produce high value chemicals such as hydrogen, ethylene, propylene, butadiene, benzene, toluene and xylene. Regarding the steam cracking of hydrocarbons, it is noted that the pyrolysis reaction of hydrocarbons follows a free radical mechanism, requiring high temperatures. Steam acts as a diluent; its main role is to reduce the partial pressure of hydrocarbons, which improves selectivity by promoting higher yields of lower olefins. Potential steam cracker feeds cover almost the entire crude oil boiling range including the following: Ethane, Propane, Butane, Dry Gas, Coker Gas, Naphtha, Kerosene, Gas Oil, Vacuum Gas Oil, Hydrowax, Base Oil, Crude and Condensate. The person skilled in the art will readily understand that the range of possible chemical reactions for application of the reactor is not particularly limited as long as high temperature gas conversion reactions are to be achieved or high temperature process heating is required such as in crude furnaces.

DESCRIPTION OF THE DRAWINGS

FIG. 1A. Schematic overview of a reactor tube according to this disclosure, fully surrounded with radiative sheeting in two segments. The power supply arrangement is shown in the top drawing.

FIG. 1B. Schematic overview of a reactor tube according to this disclosure, partly surrounded with radiative sheeting in two segments, leaving an opening for sideways inserting and removing the radiative sheeting. The power supply arrangement is shown in the top drawing.

Hereinafter the invention will be further illustrated by the following non-limiting examples.

EXAMPLES

General—Temperature Control

Figure 2:
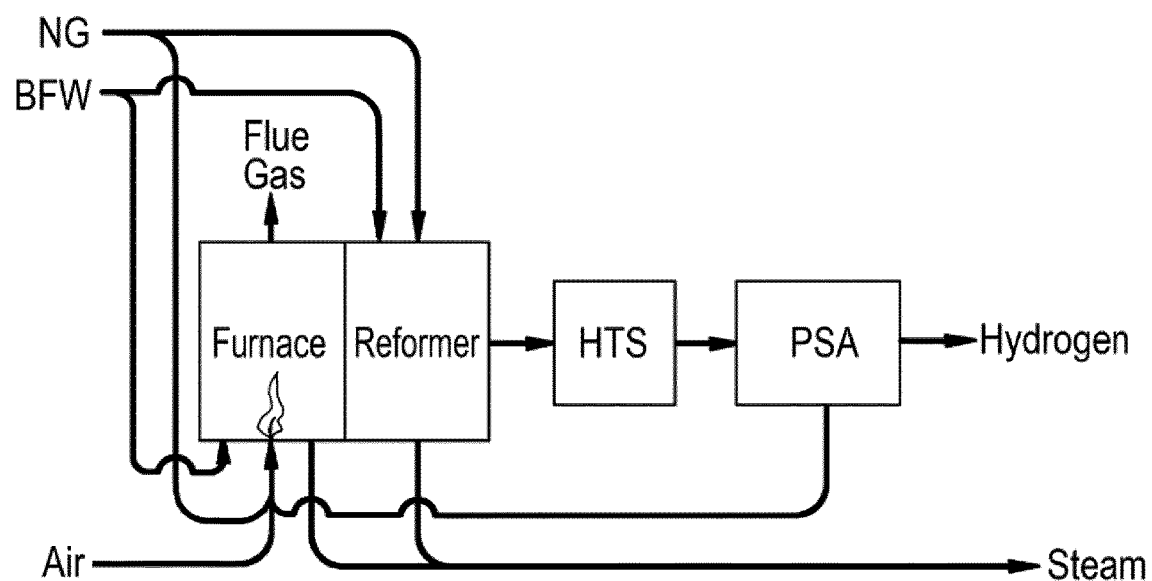
FIG. 2. Schematic representation for a conventional gas-fired heated Steam Methane Reforming & Hydrogen Manufacturing unit. NG is Natural Gas; BFW is Boiler Feed Water; HTS is High Temperature Shift; PSA is Pressure Swing Adsorption.
Figure 3:
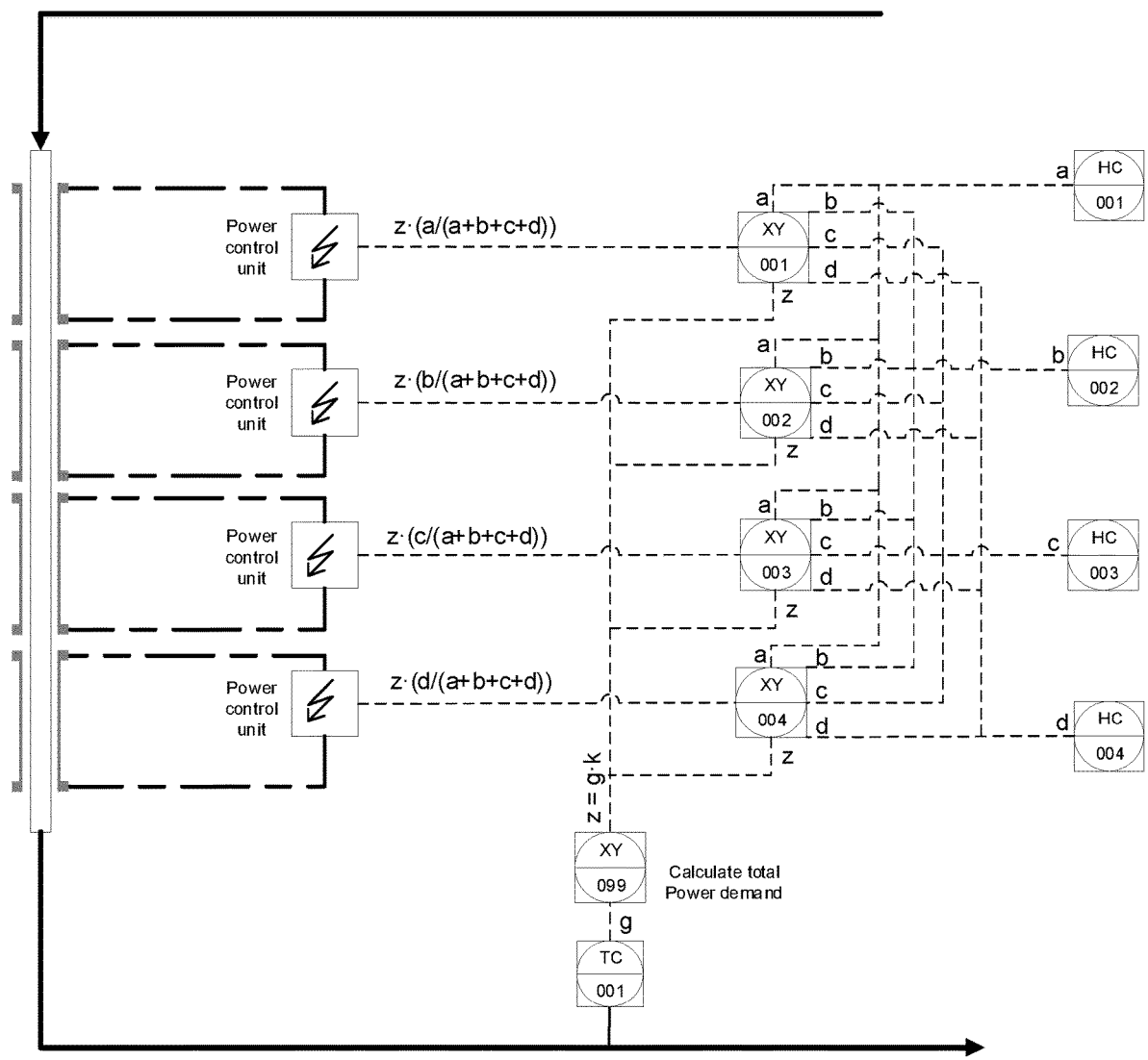
FIG. 3. Schematic representation of the power control for a reactor according to the present disclosure with four segments of radiative sheeting, each connected with a separate power control unit. The reactor is represented here by a narrow vertical rectangular tube depicted on the left of the drawing, which in reality may also be for example a U-bent tube, or a horizontal tube. Arrows indicate the reactant feed and product exit streams, respectively. TC001 is the reactor outlet temperature control, XY-099 converts the TC output to desired power, in the formula z=g·k, g is the percentage output of the temperature control (i.e. TC-001), k represents the constant to convert from controller output to desired furnace duty (for example 100 MW/100%→1 MW/%). In dividing the requested duty over the reactor, each segment has a hand controller (HC-001 to HC-004). From the output of these hand controllers, the fraction is multiplied with the afore mentioned total requested duty z in calculation blocks XY-001 to XY-004. This required power is subsequently sent to the power control unit of the specific segment.

Temperature control in a reactor according to the invention takes place as shown in FIG. 3. A heat flux/temperature profile is set by means of (hand) controllers over the length of the reactor. The highest heat flux occurs at the top of the reactor tube where both the further heating to required reaction conditions of the reaction mixture occurs and reactions start to consume heat energy. A peak is reached in heat flux after which this declines while the temperature increases. The highest temperature combined with lowest heat flux occurs at the outlet. Here chemical equilibrium is virtually achieved at the desired final temperature. To fit this profile, four segments have been designed. Each segment delivers a pre-defined fraction of the total demanded duty. This will consequently lead to a segment—reactor tube temperature equilibrium according to radiative heat transfer principles as described before (vide supra).

General—Electrical Infrastructure

The design electrical power consumption of a "100 MW furnace", including 10% design margin=117 MWe. The design premise is to start with a 132 kV AC bus and, through transformers, reduce the voltage level to the desired 690 V. The concept is to use 6×132/11 kV Transformers and 47×11/0.72 kV Transformers. From a design perspective, the large grid transformers would likely be located remote from the electrical furnace since the incoming power may be via overhead lines to an outdoor substation.

To achieve the $CO_2$ emission reductions, the power is expected to come from renewable generation capacity, but waste stream power sources may also be used in an integrated process set-up.

Example 1

Furnace with Reactor According to the Invention.

A conceptual electrical furnace design for a 100 MWe powered SMR comprises of 260 reactor tubes. Each reactor tube is equipped with 12 segments of co-axial heater tubes (i.e. radiative sheeting) along the vertical distance of the reactor tube. Each segment is ~0.9 m. Each segment is able to exchange a design heat-flux of up to 120 kW·m-2 on reactor tube outer surface having a temperature of up to 870° C. The segments at each specific elevation are interconnected in series as to obtain reasonable electrical resistance, translating in voltage level needed to control the duty at said elevation (zone). The co-annular segments are placed such as to obtain an area ratio larger than or approximating 1 (For each specific segment: Area Radiant Heater/Area Process coil~>1).

Furnace viewports (inspection ports) are designed to inspect the condition of the heater tubes.

Example 2

A Furnace According to Example 1 in Operation.

Start-Up

In comparison to a conventional SMR, electrical furnaces can be started gradually. The turndown ratio for electrical heating is virtually unlimited and consequently start-up is well controllable. Moreover, the heat distribution is uniform across all tubes. This is contrary to conventional hydrocarbon-fired SMRs where a few burners may be lit resulting in a temporary unbalance. To prevent damage to the electrical heating elements the heat-up rate should be limited.

Shutdown

To prevent damage to the reactor tubes a maximum cool down rate of 50° $C.\cdot hr^{-1}$ must be adhered to. Considering that the turndown capability is very high and provided that the electrical heating system is functioning normally, this cooldown rate limitation can be adhered to. Moreover, in trip scenarios (i.e. unexpected stopping of the process, for example, when a fire occurs) the settle-out temperature, considering all heat capacity in the heating elements and refractory must be calculated. It is expected that this temperature is sufficiently low to prevent a reactor tube bursting. Moreover, steam purge, and reactor depressurization is part of normal shut-down procedures.

Turndown

Conventional SMR furnaces have a turndown ratio of ~5 (turndown=design throughput/minimum throughput). This is predominantly governed by the ability of the furnace burners and fuel characteristics. Instead, electrically powered furnaces have a virtually unlimited turndown ratio. New limitations for the turndown are caused by the limitations on the process side, such as flow distributions over the reactor tubes.

Trip

To prevent power grid instability in the event of the load rejection associated with tripping for example a 100 MWe duty not associated with an electrical fault, a delay may be implemented to allow the electrical grid to adjust to the power rejection, so that the load is not all rejected in one step. Such a delay is in the order of seconds to a few minutes. Future development should identify the exact strategy by grid stability assessment. From a process point of view, such delays can be accommodated. When a trip occurs, steam is injected into the reactor tube and the process is depressurized.

Trouble Shooting

For various reasons, the reactor tubes can become overheated. For example, localized catalyst activity loss can occur, carbon formation resulting in a plugged reactor tube or voids can be present due to wrong catalyst loading. According to the present disclosure, it may be possible to monitor the reactor tubes during operation. Inspection ports can be designed in an electrical furnace to be able to inspect the reactor tubes during operation. Normally this is assessed using infrared radiant measurement techniques (e.g. pyrometer).

Example 3

Comparative data for a 3 MW electrical capacity SMR hydrogen manufacturing unit using reactors according to the invention, when compared to a conventional hydrocarbon-fired unit:

|  |  | Electrically heated (invention) | Conventional hydrocarbon fired |
|---|---|---|---|
| Total hydrogen production | kmol/h | 118.27 | 118.27 |
| Total hydrogen production | ton/day | 5.72 | 5.72 |
| Steam/Carbon SMR Feed |  | 3.20 | 3.20 |
| Natural gas intake | ton/day | 11.60 | 19.33 |
| $CO_2$ emissions | ton/day | 31.55 | 52.84 |
| Overall efficiency (incl. steam export) |  | 88% | 82% |
| Overall efficiency (excl. steam export) |  | 88% | 74% |
| SMR furnace (electrical) heating duty | MW | 3.00 | 2.44 |
| SMR furnace process temperature | ° C. | 860 | 860 |
| Steam production | ton/day | 63.12 | 92.84 |

I claim:

1. An electrically heated reactor having an outer surface area, an inlet and an outlet, wherein
   (a) the reactor is a tube surrounded by electrical heating means at a certain distance;
   (b) the electrical heating means comprises radiative sheeting placed coaxially around the reactor tube, the surface area of the sheeting facing the outer surface area of the reactor tube defining an inner surface area of the electrical heating means;
   (c) the inner surface area of the heating means covers at least 60% of the reactor tube outer surface area; and
   (d) the distance between the reactor tube and the heating means is selected such that the ratio between the inner surface area of the electrical heating means to the reactor tube outer surface area is in the range of 0.7 to 3.0.

2. The process according to claim 1, wherein the radiative sheeting is divided into at least two segments which are placed lengthwise along the reactor tube, each of which segments being connected to a separate power control.

3. The process according to claim 1, wherein the radiative sheeting comprises NiCr or FeCrAl based resistance heating materials.

4. The process according to claim 1, wherein the heating means is a radiative sheeting placed coaxially around the reactor tube, while leaving an opening along the length of the reactor tube with a size that matches the diameter of the reactor tube.

5. The process according to claim 1, wherein the heating means is a radiative sheeting consisting of panels of the radiative heating material.

6. A furnace, comprising within the furnace one or more reactor tubes according to claim 1, said one or more reactor tubes having an entrance and exit outside of the furnace; and one or more inspection ports in the furnace wall, each of which inspection ports being placed opposite to a reactor tube.

* * * * *